United States Patent [19]

Ebert et al.

[11] Patent Number: 4,720,132
[45] Date of Patent: Jan. 19, 1988

[54] ELECTRICALLY CONDUCTIVE STIFFENING WIRE FOR A SUN VISOR FOR VEHICLES

[75] Inventors: Charles Ebert, Luxeuil, France; Hermann Krehl, Baden-Baden; Lothar Viertel, Berus, both of Fed. Rep. of Germany; Bernard Hilbert, Cappel, France; Rüdiger Walter, Ladenburg, Fed. Rep. of Germany

[73] Assignee: Gebr. Happich GmbH, Fed. Rep. of Germany

[21] Appl. No.: 4,329

[22] Filed: Jan. 15, 1987

[30] Foreign Application Priority Data

Jan. 22, 1986 [DE] Fed. Rep. of Germany ....... 3601762

[51] Int. Cl.⁴ .............................................. B60J 3/02
[52] U.S. Cl. ............................. 296/97 K; 296/97 H; 362/144
[58] Field of Search ................ 296/97 H, 97 R, 97 K; 362/74, 140, 141, 142, 802, 61, 144

[56] References Cited

U.S. PATENT DOCUMENTS 4,174,864 11/1979 Viertel et al. ..................... 296/97 H Primary Examiner—Robert R. Song
Attorney, Agent, or Firm—Ostrolenk, Faber, Gerb & Soffen

[57] ABSTRACT

A sun visor for vehicles is formed of a sun visor body constructed of plastic foam which is stiffened by a two section stiffening wire. The sun visor is supported by a mounting housing, located at one corner of the sun visor body. The mounting housing receives a sun visor support shaft. An outer support pin which can be detachably connected to a support member of the vehicle is located longitudinally opposite of the mounting housing. The mounting housing defines a first insertion opening into which is plugged one end of one of the stiffening wires and a second insertion opening which accommodates a leaf spring which bears on the sun visor support shaft. The outer support pin and the mounting housing have additional insertion holes which enable rapid connection of the stiffening wire sections to the outer support pin and to the mounting housing by plugging of the components into one another. The two stiffening wire sections are further utilized to conduct electrical power to a sun visor lamp.

12 Claims, 9 Drawing Figures

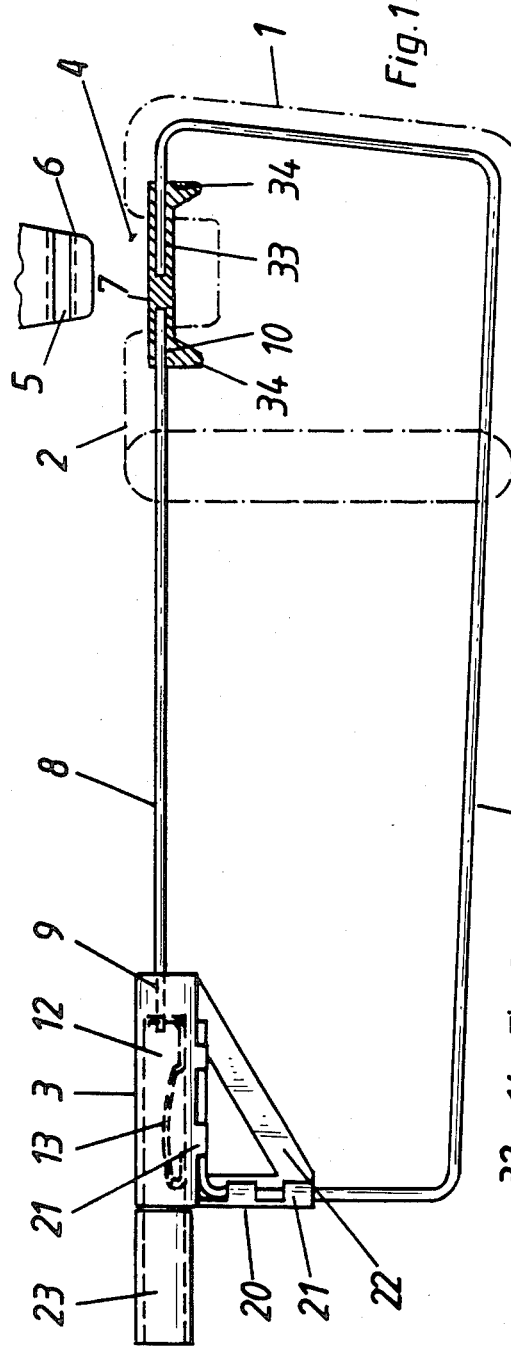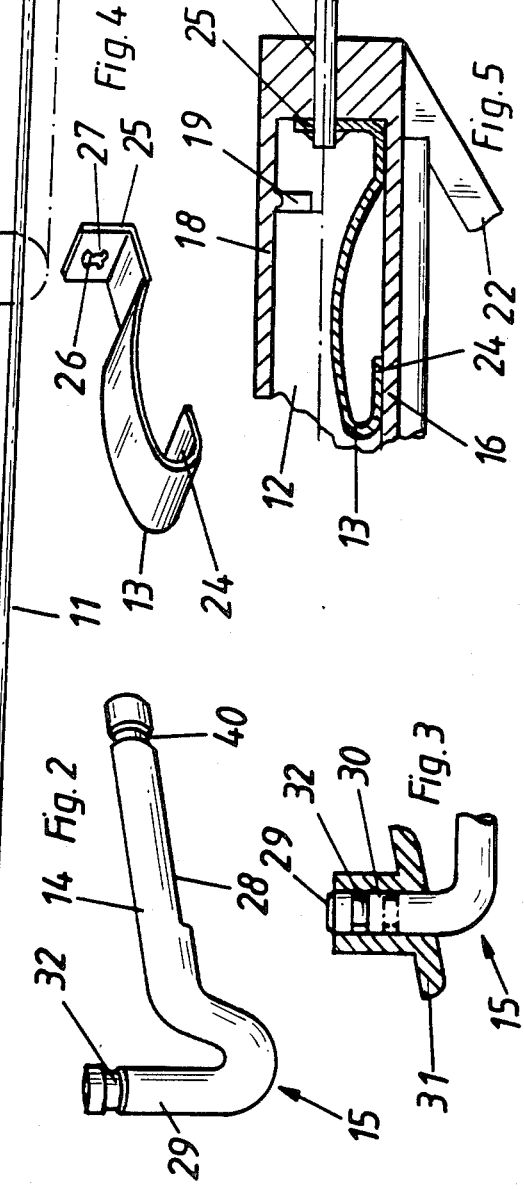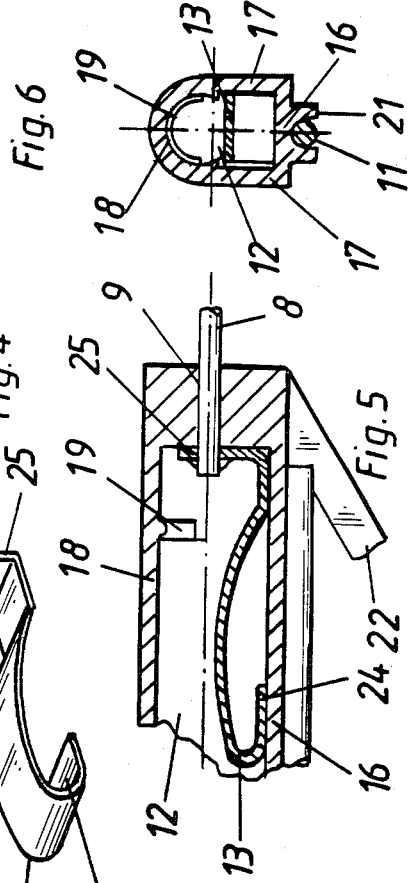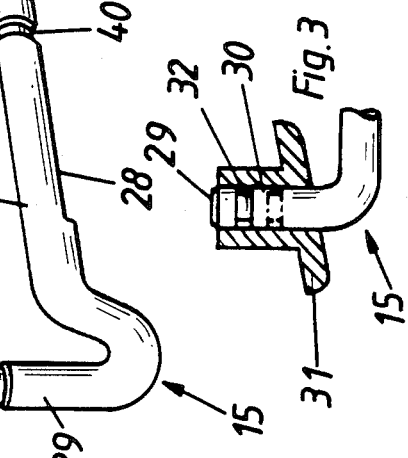

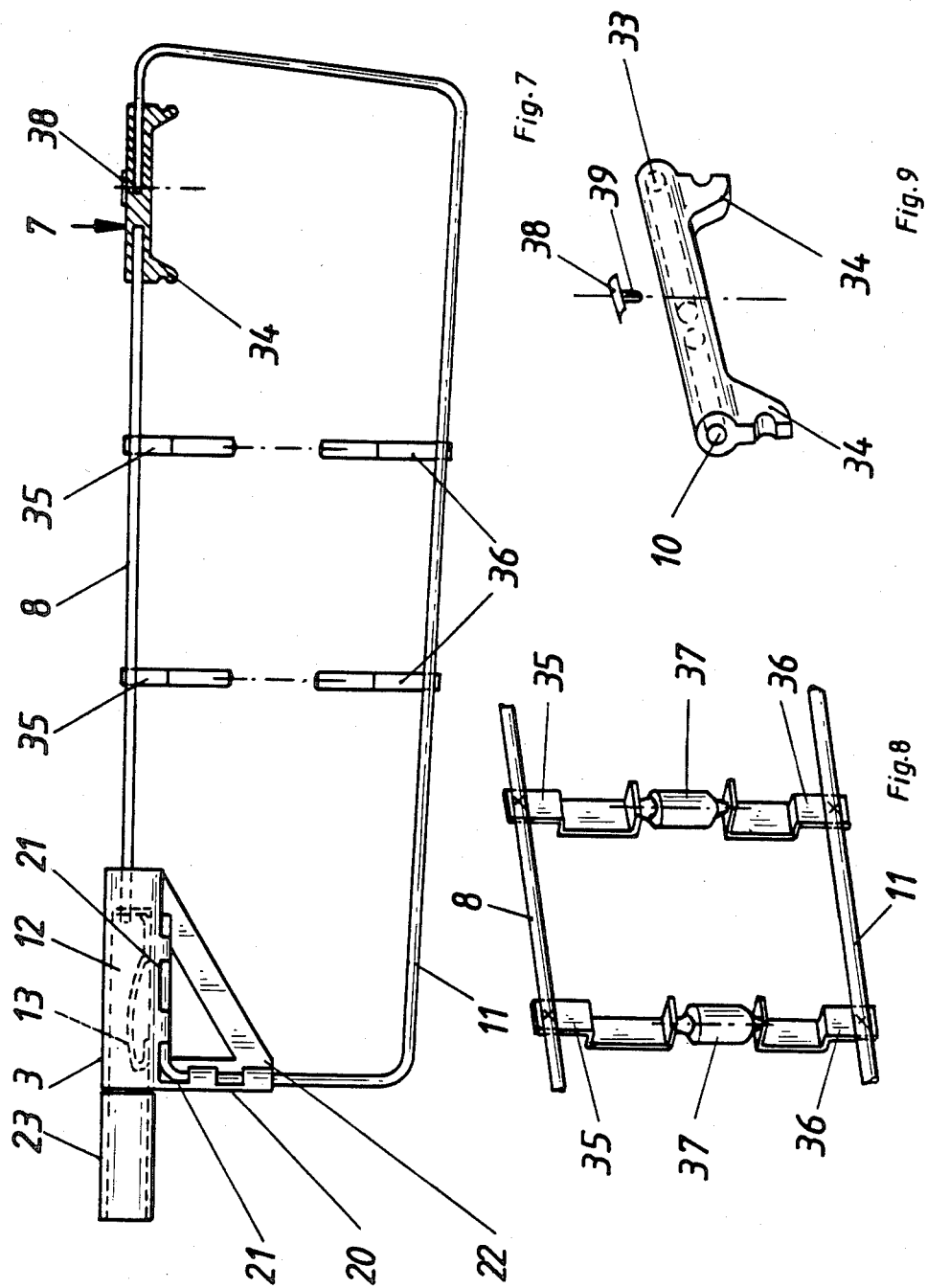

ELECTRICALLY CONDUCTIVE STIFFENING WIRE FOR A SUN VISOR FOR VEHICLES

BACKGROUND OF THE INVENTION

The present invention is related to sun visors for vehicles, and more particularly to the stiffening wires of the sun visor which are additionally utilized as electrical conductors to supply current to a sun visor lamp. The sun visor is of the type having a generally rectangular and flat sun visor body which is formed of foam plastic covered by a covering and stiffened by the stiffening wires.

A mounting housing, which receives the vehicle sun visor support shaft from the vehicle, is located at one corner of the sun visor body and within the foam plastic and is secured to the stiffening insert. The mounting housing holds a spring which exerts a frictional force on the sun visor shaft to prevent unwanted rotation of the sun visor body about the shaft. Longitudinally opposite of the mounting housing, the sun visor body has an outer support pin which traverses a cutout edge region in the sun visor body. The outer support pin enables the sun visor to detachably engage a mounting receiver which is fastened to the body of the vehicle.

A sun visor of the above type is described, for example, in Federal Republic of Germany AS 125 97 25. The known sun visior has a relatively complex construction, primarily because the stiffening insert consists of several peculiarly shaped bent sections of wire which must be welded to the mounting housing and/or to the outer support pin. This increases the cost of manufacturing the sun visor.

Similar disadvantages may also be noted in a sun visor which is described for example in Federal Republic of Germany AS 111 986. Further, Federal Republic of Germany Patent 1 179 353 illustrates the difficulties encountered in connecting the sun visor shaft to the mounting block and the many parts which are required for assembling a conventional sun visor.

SUMMARY OF THE INVENTION

It is an object of the present invention to provide a simpler and less expensively manufactured sun visor of the above type.

It is another object of the invention to provide a sun visor construction which is constituted of parts which can be more easily assembled.

It is a further object of the present invention to provide a sun visor construction which is more easily assembled by plugging the stiffened wires into the mounting housing and/or the outer support pin.

The foregoing and other objects of the present invention are realized by forming the stiffening insert of two lengths of wire sections. The first wire section is constituted of a generally straight wire which extends between the mounting housing and the outer support pin. The second wire section is generally C-shaped with the free ends of the C being reentrantly bent toward each other. The two ends are respectively connected to the mounting housing and to the outer support pin.

The stiffening wires, mounting housing, and outer support pin are easily and rapidly interconnected by plugging the free ends of the wires into receiving holes provided in the mounting housing and in the outer support pin. The mounting housing has a first insertion opening for receiving a first end of the straight wire section and a second insertion opening, described in greater detail below, for holding a spring and the sun visor support shaft which supports the sun visor and which permits it to rotate and swivel in the familiar manner. The other end of the straight wire section is received in the outer support pin. The two ends of the C-shaped wire section are respectively received in another wire receiving opening of the outer support pin and in detent lugs provided along the exterior of the mounting housing.

The second insertion opening which receives the spring is defined by a bottom wall, two side walls extending perpendicularly to the bottom wall and a semicircular top wall having a curvature which matches the curvature of the shaft of the sun visor shaft. The mounting housing further includes a projection which is located in the second insertion opening and which holds the sun visor shaft. The two insertion openings in the mounting housing communicate into one another and extend generally coaxially, following one another.

The spring is of the leaf spring type and includes at one end a spring tongue formed of a leaf section which is bent about 180° behind the rest of the spring to provide a rest portion which rests on the bottom wall of the insertion opening. The other end of the leaf spring is bent upwardly about 90° to form a strap that extends across the second opening and passes the first opening. An insertion hole formed in the strap is designed to receive one end of one of the wires, of which the stiffening insert is formed. Between its strap and tongue, the spring has an arcuately curved shape. The receiving hole in the strap is aligned with the first insertion opening so that upon insertion of the stiffening wire through the first insertion opening, the end of the stiffening wire is received and secured in the hole provided in the leaf spring.

The diameter of the sun visor shaft at the end thereof which is received in the second insertion opening is smaller than the diameter of the shaft at the other end which is mounted in the mounting block which is secured to the vehicle.

The components of the sun visor mounting housing according to the present invention are formed of small and simple components which can be inexpensively manufactured and which enable assembly of the components by the simple plugging of the components into one another, a task which is further simplified with the use of an assembly jig.

The outer support pin, as mentioned, has two separate insertion openings for receiving ends of the straight and the C-shaped wire sections. The two openings are separated by a wall to assure that the two wires would not contact one another and thus interfere with the ability to use the wires as electrical conductors for a sun visor lamp described later herein. Further, the outer support pin is preferably provided at its end regions with transverse material extensions which anchor the outer support pin in the foam plastic of the sun visor body. This prevents twisting of the outer support pin.

Moreover, the mounting housing and outer support pin are preferably injection molded plastic pieces. The projection in the second insertion opening of the mounting housing is then inherently resilient to allow the sun visor shaft to be more easily pulled out of the mounting housing.

The mounting housing may be provided with a web-shaped extension which extends perpendicularly to the longitudinal direction of the insertion openings. The body extension is formed with means, such as detent lugs, for grasping and holding one of the end regions of the C-shaped stiffening wire section.

Preferably, each of the stiffening wires has a contact plate which is fastened thereto by spot-welding, crimping or the like. An electrical incandescent lamp tubular in form is disposed electrically between the contact plates and suitable connections are provided for conducting electric power via the wires, preferably through the ends of the stiffening wires at the outer support pin and mounting housing.

Other features and advantages of the present invention will become apparent from the following description of preferred embodiments of the invention which refer to the drawings.

BRIEF DESCRIPTION OF THE DRAWINGS

FIG. 1 is an elevational view of a first embodiment of the stiffening insert and mounting housing of the sun visor of the present invention.

FIG. 2 shows the sun visor shaft.

FIG. 3 is a cross-section through the block mounting element which is used to attach the sun visor shaft to the vehicle body.

FIG. 4 shows the leaf spring of the mounting housing.

FIG. 5 is a longitudinal cross-section through the mounting housing illustrating the location of the leaf spring.

FIG. 6 is a transverse cross-section through the mounting housing.

FIG. 7 is an elevational view of a second embodiment of the stiffening insert and mounting housing of the sun visor of the present invention.

FIGS. 8 and 9 illustrate further details of the sun visor embodiment of FIG. 7.

DETAILED DESCRIPTION OF PREFERRED EMBODIMENTS

FIG. 1 shows with a dashed line a foamplastic sun visor body 1 which is conventionally enveloped by a cover sheet (not shown). Body 1 is stiffened by a two section stiffening wire insert formed of parts 8 and 11. The sun visor body 1 is flat, approximately rectangular and is provided at one corner along its upper longitudinal edge 2 with a mounting housing 3. Mounting housing 3 is embedded in the foam plastic of sun visor body 1 and is connected in a manner described below to the stiffening insert 8, 11. Mounting housing is preferably a plastic injection molded piece.

At the opposite end of upper longitudinal edge 2, sun visor body 1 contains and supports at a recess 4 in the top of body 1 an outer support pin 7 which is designed to be detachably received by an outer support 6 which is disposed in a mounting receiver 5 which is secured to the body of the vehicle (not shown).

The stiffening insert includes a first, straight wire section 8 which extends between mounting housing 3 and outer mounting pin 7 and a second, generally C-shaped bent wire section 11. One end of straight wire section 8 is received in a smaller cross-section insertion opening 9 at the right side end of mounting housing 3. The other end of wire section 8 engages in insertion opening 10 of outer support pin 7. The free ends of the C-shaped bent wire section 11 are respectively fastened to mounting housing 3 and to outer support pin 7, and these connections are detailed below.

Mounting housing 3 has a second larger cross-section insertion opening 12 which is accessible from the opposite, left side end of mounting housing 3 and which is disposed so that the two insertion openings 9 and 12 communicate and in fact are aligned and coaxial. Insertion opening 12 is sized to receive a spring 13 as well as the axle stub 14 of a generally L-shaped sun visor shaft 15 (FIG. 2). Along its upper region, insertion opening 12 (FIG. 5) has a semicircular cross-section and toward its bottom, the opening 12 changes into a rectangular cross-section opening in mounting housing 3. More specifically, insertion opening 12 is bounded by a bottom wall 16, two side walls 17 which extend perpendicularly to and adjoin bottom wall 16, and a semicircular top wall 18. The curvature of top wall 18 is selected to complement the radius of curvature of sun visor shaft 15.

A projection 19 (FIG. 5) projects radially inwardly within insertion opening 12. Projection 19 may have a boss shape or it may be, as shown in FIG. 5, a bead.

A web-shaped extension of material 20 from mounting housing 3 extends perpendicularly down from the main elongated body of the housing. The extension 20 serves to connect mounting housing 3 to bent wire reinforcing section 11 by way of detent lugs 21 which receive wire section 11. Strut 22 connects the far ends of extension 20 and the main body of housing 3 to stiffen and rigidify the mounting housing 3. Several of the detent lugs 21 also are disposed along the longitudinal direction of mounting housing 3 and serve to secure and hold an end section of wire 11 which is reentrantly bent to extend in the longitudinal direction of sun visor body 1.

Mounting housing 3 is molded with a tubular extension 23 which extends away from sun visor body 1 to prevent penetration of foam into insertion opening 12 during fabrication of the sun visor. The extension 23 is subsequently broken off from the final sun visor product.

Spring 13 (FIG. 5) is sized to be received within insertion opening 12. It has a leaf spring construction. A spring tongue 24 at one end is formed of a section reentrantly bent by 180° and the tongue is shaped to allow spring 13 to rest on bottom wall 16. The opposite end of spring 13 has an upwardly bent strap 25 that extends across opening 12 with an insertion hole 26 through it having claws 27 formed therein which are suitable for holding the end of wire section 8 that is inserted in the hole 26. Hole 26 is aligned with insertion opening 9 to enable direct and simple plugging of wire section 8 into spring 13.

Axle stub 14 of sun visor shaft 15 is designed to be inserted into mounting housing 3 through the opening defined at the location where extension 23 was originally connected. When stub 14 of shaft 15 is inside insertion opening 12, projection 19 of mounting housing 3 snaps into annular groove 40 of stub 14. The flat 28 on the underside of stub 14 is engaged by spring 13 when sun visor body 1 is in its non sunblocking position, usually against the roof of the vehicle.

Outer support pin 7, like mounting housing 3, is also preferably a plastic injection molded piece. It includes a second insertion opening 33 which is sized to receive the second bent end of wire section 11. Extensions 34 of outer support pin 7 extend into the plastic foam material to rigidify and securely anchor support pin 7 in the plastic foam.

The lamp and electrical connections to them are not shown in FIG. 1. FIGS. 7-9 illustrate means for supporting and providing electrical power to an illuminating device such as one or more lamps 37. One lamp is described. The others are essentially the same. Contact plates 35, 36 are fastened to wire sections 8 and 11, respectively, and the illuminating device 37 is located between and electrically connected between contact plates 35 and 36. The illuminating device comprises an incandescent bulb such as tubular lamp 37.

Lamp 37 may be located in a recess (not shown) in the shape of a trough which is formed in sun visor body 1. The trough may be covered with a translucent cover and further by a mirror. In the latter case, the illumination may be next to the mirror or may shine through a frame surrounding the mirror, in the usual manner with such sun visors.

An electrical contact 38 is inserted in outer support pin 7 for providing an electrical connection to stiffening wire section 11. Contact 38 may be a pin 39 which is pressed into a bore hole (not shown) disposed perpendicularly to the longitudinal direction of outer support pin 7 in a manner which enables it to contact the end region of wire section 11. Contact 38 abuts a mating contact (not shown) located in a mounting receiver 5 (FIG. 1), associated with outer support 6.

The straight wire section 8 is electrically in contact with spring 13. When support shaft 14, which is made of metal, is disposed within second insertion opening 12, it contacts the spring and completes the electrical connection of wire section 8 to the shaft. The shaft is electrically connected (not shown) either to a wire in the vehicle body or electrically to the vehicle body itself. Thus, stiffening wire sections 8 and 11 provide electrical power to lamps 37.

The positive terminal of lamp 37 may receive power through contact 38 while its ground connection is preferably completed via wire section 8 and the sun visor shaft.

Although the present invention has been described in relation to a preferred embodiment thereof, many other variations and modifications will now become apparent to those skilled in the art. It is preferred, therefore, that the present invention be limited not by the specific disclosures herein, but only by the appended claims.

What is claimed is:

1. A sun visor, comprising:
  a sun visor body, a stiffening wire including a first wire section and a separate second wire section which extend in the sun visor body and stiffen the visor body, the first and second wire sections being formed of an electrically conductive material and being electrically separate;
  first means for providing an electrical connection between the first wire section and an electrical source; the first means including a mounting housing disposed in the body, the mounting housing being effective to connect the sun visor body to a sun visor support shaft, means in the mounting housing for receiving the first wire section plugged into the mounting housing and an electrically conductive part in the mounting housing for contacting the first wire section and for connecting the first wire section to an electrical source; and
  second means for providing an electrical connection between the second wire section and the electric source, and the first and second wire sections being at opposite electric poles.

2. The sun visor of claim 1, in which the second means includes an outer support pin disposed in the visor body spaced away from the mounting housing.

3. The sun visor of claim 2, in which the electrically conductive part in the mounting housing is a spring which presses against the support shaft and makes electric contact therewith and also inhibits rotation of the visor body around the support shaft.

4. The sun visor of claim 3, further comprising an illuminating device which is electrically connected between the first and second wire sections.

5. The sun visor of claim 4, wherein the illuminating device comprises an incandescent lamp.

6. The sun visor of claim 4, further comprising contact plates which are respectively secured to the first and second wire sections and are connected to the illuminating device for conducting electricity to the device through the first and second wire sections.

7. The sun visor of claim 6, wherein the contact plates are welded to the wire sections.

8. The sun visor of claim 4, wherein the second means further includes a removable electrical contact having a pin portion, a bore hole in the outer support pin, the pin portion being insertable into the bore hole to contact the second wire section.

9. The sun visor of claim 4, further comprising a recess for holding the illuminating device.

10. The sun visor of claim 9, wherein the illuminating device comprises a plurality of lamps which are electrically connected between the first and second wire sections.

11. The sun visor of claim 4, further including first and second insertion openings in the outer support pin, the first and second insertion openings receiving, respectively, a first respective end of both of the first and the second wire sections.

12. The sun visor of claim 4, further including a respective wire receiving opening in the mounting housing for receiving a second end of the first wire section and including detent lugs at the mounting housing for holding a second end of the second wire section.

* * * * *